J. H. GRAVELL.
AUTOMATIC SWITCHING DEVICE FOR ELECTRIC METAL WORKING APPARATUS.
APPLICATION FILED OCT. 24, 1918.
1,314,515.
Patented Sept. 2, 1919.
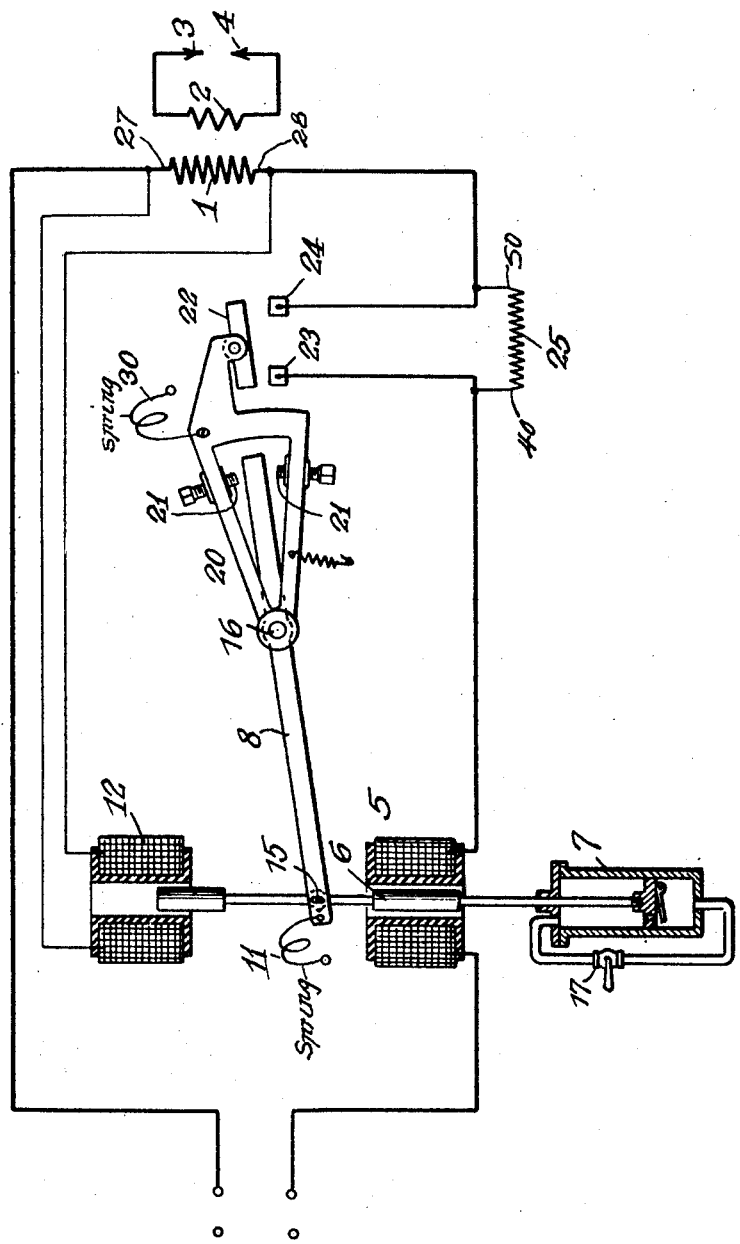
INVENTOR
James H. Gravell
BY
ATTORNEYS

UNITED STATES PATENT OFFICE.

JAMES H. GRAVELL, OF BROOKLYN, NEW YORK, ASSIGNOR TO THOMSON ELECTRIC WELDING COMPANY, OF LYNN, MASSACHUSETTS, A CORPORATION OF MASSACHUSETTS.

AUTOMATIC SWITCHING DEVICE FOR ELECTRIC METAL-WORKING APPARATUS.

1,314,515.  Specification of Letters Patent.  Patented Sept. 2, 1919.

Application filed October 24, 1918. Serial No. 259,516.

*To all whom it may concern:*

Be it known that I, JAMES H. GRAVELL, a citizen of the United States, and a resident of Brooklyn, in the county of Kings and State of New York, have invented certain new and useful Improvements in Automatic Switching Devices for Electric Metal-Working Apparatus, of which the following is a specification.

My invention relates to electric metal working apparatus and more particularly to means for automatically controlling the flow of the heating current passed through the work in an electric welding or similar operation.

The invention is especially applicable to electric metal working apparatus in which a step down transformer is employed although some of its features are applicable to other forms of apparatus.

One of the objects of my invention is to facilitate the operation of the apparatus so that work may be done at greater speed owing to the fact that the operations are entirely automatic and in response to the act of the operator of the machine in merely inserting and withdrawing the work from the heating circuit, thereby avoiding the use of mechanically operated switches for turning the welding or heating current off and on either at the beginning or close of the operation.

Another object of my invention is to provide an automatic switching mechanism which will definitely control the duration of the welding or heating current.

Another object is to provide an apparatus automatic in its action, wherein the heating of the work will be continued after the operation of the automatic current controlling switch. This part of my invention is especially useful in welding high carbon steel in which operation it is well known that the metal is liable to become hard and brittle after it has been heated for welding due to the rapid cooling of the parts. This difficulty is especially present in electric spot welding where the heated metal is directly in contact with the cold welding terminals.

To avoid this difficulty the practice has been heretofore to anneal the parts welded after the operation so as to soften them and correct the brittle nature of the metal at the weld.

My invention provides a means whereby the flow of the current for welding is not wholly interrupted at the completion of the weld but continues to flow although in diminished amount while the work is retained in position in the machine, thus making it impossible for the terminals to cool the work rapidly and thereby securing a weld that will not be brittle.

In the accompanying drawings I have shown in a diagrammatic way an arrangement of apparatus constituted for practising my invention, the electrical or magnetic parts employed being of a typical or standard form or nature and the mechanical devices being of simple structure and of a nature readily understood from the showing of them in side elevation.

1 indicates the primary and 2 the secondary of a welding or heating transformer, while 3 and 4 indicate respectively the terminals of the secondary circuit which are applied to the work to heat the same in the welding or other operation.

20 indicates a current controlling switch for controlling the flow of heating current, preferably by operating upon the circuit of the primary, by means, for instance, of a bridging contact 22 adapted to close and open the circuit across contacts 23, 24.

25 indicates an artificial resistance which is shunted when the contacts 23, 24 are bridged by the member 22 of the switch. When, however, the switch opens to modify the flow of heating current, the circuit of the primary is not wholly interrupted but current continues to flow therein in diminished amount through the resistance 25. The current controlling switch 20 is actuated by means of lever 8 or other suitable mechanism adapted to engage adjustable lugs 21 projecting from lever 20. When the device 8 has moved a predetermined distance under the influence of an actuating magnet 5 or other power, it engages one of said lugs and opens the circuit through the contacts 23, 24. The reverse action to close the circuit is produced by suitable actuating means in the form of a spring, a magnet or other power. For simplicity and in order to secure the desired automatic operations in a simple manner, the said magnet 5 may be included in the primary circuit as indicated. The magnet may be a solenoid magnet having a core 6 acting on lever 8 against the influence of a spring 11. Connected with the actuating devices is a suitable retarding device which times the action of said devices to control the duration of flow of the heating current by predetermining the interval which must elapse before the actuator 8 engages the arm 21 to throw the current controlling switch. Such a timing or retarding device is indicated at 7 as comprising a dashpot, although, as will be well understood, other means for retarding or timing the operation might be employed.

17 indicates an adjustable valve in connection from end to end of the dash-pot whereby the rate of flow of the fluid or liquid displaced by the dash-pot piston may be regulated to time the movement of the plunger 6 and actuate lever 8.

12 is an electromagnet suitably connected to the circuits of the apparatus so as to respond to a variation of current flow in the system consequent upon the interruption of the heating current flow between the terminals, 3, 4. In the case of a welding apparatus the mere withdrawal of the work from the machine will effect such interruption. The magnet 12 operates upon the lever 8 reversely to magnet 5 and is connected in shunt to a resistance in the primary circuit. Preferably it is in shunt to the primary 1 of the transformer.

The operation of the system is as follows:—

To produce a quick and positive action of the switch when the time arrives for its operation a device of the character employed in snap switches may be used. Thus for instance spring 11 may be applied so that in one extreme of position of the lever it will act above the pivotal center 16 in a direction to hold the lever 8 up and as soon as the lever in its downward movement carries the end of the spring below the pivotal center, it will operate upon said lever to depress the end to which the spring is applied quickly. In order that the lever may be free to move under the action of a spring unrestrained by the dash-pot, the core 6 may be connected with said lever by means of a pin 15 working in a slot in the lever 8. The spring 30 may be similarly applied to the switch lever 20 to hold it or assist in holding it in each of its positions.

The work is placed between the welding terminals 3 and 4 which are then brought together. The solenoid 5 by its plunger 6 actuate the lever 8, pulling it down with a slow motion produced by the retarding device. As soon as the solenoid core or plunger 6 has moved down sufficiently under the influence of the magnet 5 and with a slow motion determined by the adjustment of the member 17 sufficiently to depress the end of lever 8 and bring the action of the spring 11 into line below the pivotal center 16, said lever will be moved by the spring independently of the solenoid and, its opposite end, by engaging the upper lug 21, will throw up switch lever 20 by quick action and open the circuit between the terminals 23, 24. This practically interrupts the welding circuit but leaves the resistance 25 in the primary circuit. The parts retain this position under the influence of the spring 11, assisted if desired by spring 30, owing to the fact that the electromagnet 12 is not sufficiently energized to overcome the influence of spring 11 and there is little difference of potential across the terminal 27, 28 of the transformer, the current being held back by the resistance 25. If desired the work may be allowed to remain in the secondary circuit with a diminished current flowing through the same owing to the presence of the resistance 25.

When the work is removed from between the welding terminals 3 and 4, the potential difference across the resistance terminals 40 and 50 falls and at the same time the potential difference across the transformer primary rises: this causes increased current to flow through the electromagnet 12 which thereupon pulls up lever 8, causing it to assume its normal position, in doing which it actuates the primary switch lever and restores the same to position, thus completing the primary circuit and enabling the apparatus to assume a condition for receiving a new piece of work.

It is quite evident from the description that the primary current is always flowing and the welding terminals are fully charged when they make contact with the work, enabling the weld to start as soon as the welding terminals make contact with the work, thus avoiding the interval of time required in the usual practice of first contacting the terminals with the work and then applying the current by means of switch manually or automatically operated. Owing to the fact that the switching mechanism is entirely automatic and operated remotely from the welding terminals, all complicated switch appliances are avoided and the operator may direct his undivided attention to the simple operation of welding. It is also evident that after the retarding means is adjusted or regulated the duration of the welding current is exactly the same for each weld thereby producing uniform results.

It will be noted that this system not only affords an automatic switch but at the same time provides a regulable time factor device for the switch.

What I claim as my invention is:—

1. In an automatic switching device for electric metal working apparatus, the combination of a transformer, a switch controlling the flow of the heating current, means for holding the same in open position and restoring means responsive to interruption of the secondary circuit of the heating transformer by removal of the work.

2. In an automatic switching device for electric metal working apparatus, the combination of a transformer, a switch in the primary circuit, means for holding the same in open position and a restoring magnet connected across the terminals of the primary as and for the purpose described.

3. In an automatic switching device for electric metal working apparatus, the combination of a transformer, a switch adapted to open and close the primary circuit, a resistance shunted by said switch, means for holding the switch open and a restoring magnet in a shunt of the primary circuit.

4. In an automatic switching device for electric metal working apparatus, the combination of a transformer, a switch adapted to open and close the primary circuit and having its parts forming a shunt around the resistance, a magnet in the primary circuit for opening the switch and reversing magnet in a shunt around the primary coil of the transformer.

5. In an electric metal working apparatus, the combination of a switch adapted to control the flow of heating current, means for actuating the same and means for retarding the movement of the parts to adjust or predetermine the duration of the heating current.

6. In an electric metal working apparatus, the combination with a controlling switch controlling the flow of heating current, of actuating means for said switch adapted to engage and operate the same and a timing device controlling the time of operation of the switch and the duration of the heating current.

7. In an electric metal working apparatus, the combination of a controlling switch, an actuating device adapted to engage said switch and operate the same, an actuating magnet and a dash-pot controlling the movement of the actuator.

8. In an electric metal working apparatus, the combination of a controlling switch controlling the flow of the heating current, an actuator therefor, an operating electromagnet for the actuator and the timing device connected to the actuator.

9. In an electric metal working apparatus, the combination with a transformer, of a controlling switch having contacts in the circuit of the primary, an artificial resistance shunted by said contacts, a switch actuating magnet included in the primary circuit and a restoring magnet in a shunt around the primary of said transformer.

10. In an electric metal working apparatus, the combination of a controlling switch controlling the flow of heating current, means for retarding the action of said switch to predetermine the duration of flow of heating current, means for holding said switch in open position and a restoring magnet responsive to interruption of the flow of heating current due to removal of the work.

11. In an electric metal working apparatus, the combination of a switch controlling the flow of heating current, means responsive to said flow for operating the switch to stop the flow, means for holding the switch in open position and a releasing magnet responsive to the interruption of flow of heating current due to removal of the work.

12. In an electric metal working apparatus, the combination of an automatic circuit breaker controlling the flow of heating current and an artificial resistance around the points of said circuit breaker for continuing the flow in diminished amount after completion of the heating operation.

13. In an electric welding apparatus, the combination with the current controlling switch of means for operating the same upon the lapse of a predetermined interval of time and means for continuing the flow of welding current after the operation of said switch.

14. In an electric metal working apparatus, the combination with a current controlling switch and a controller magnet therefor connected across the resistance in the primary circuit of the transformer so as to be responsive to interruption of current flow in the secondary due to withdrawal of the work.

15. In an electric metal working apparatus, the combination of a transformer, a current controlling switch controlling the flow of heating current in the secondary and a controller magnet for said switch placed in shunt to the primary so as to be responsive to interruption of current flow in the secondary due to the withdrawal of the work.

Signed at New York, in the county of New York and State of New York this 23d day of October A. D. 1918.

JAMES H. GRAVELL.